United States Patent
Baba

(10) Patent No.: US 7,823,696 B2
(45) Date of Patent: Nov. 2, 2010

(54) GEAR UNIT AND LUBRICATING OIL SPLASH PREVENTING METHOD

(75) Inventor: Kentarou Baba, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 204 days.

(21) Appl. No.: 12/026,690

(22) Filed: Feb. 6, 2008

(65) Prior Publication Data

US 2008/0185227 A1    Aug. 7, 2008

(30) Foreign Application Priority Data

Feb. 7, 2007   (JP) .............................. 2007-027802
Jan. 22, 2008  (JP) .............................. 2008-11335

(51) Int. Cl.
  *F01M 1/00*    (2006.01)
  *F01M 11/02*   (2006.01)
  *F16M 11/02*   (2006.01)
  *F16N 7/26*    (2006.01)

(52) U.S. Cl. ............. 184/6.12; 184/11.1; 184/11.2

(58) Field of Classification Search ........... 184/6.12, 184/11.1, 11.2; 74/606 R
See application file for complete search history.

(56) References Cited

U.S. PATENT DOCUMENTS

| | | | | |
|---|---|---|---|---|
| 4,231,266 A * | 11/1980 | Nishikawa et al. | ......... | 74/467 |
| 4,781,259 A * | 11/1988 | Yamaoka et al. | ......... | 475/230 |
| 4,879,921 A * | 11/1989 | Asada et al. | ......... | 74/467 |
| 5,158,152 A * | 10/1992 | Nemoto et al. | ......... | 184/6.12 |
| 5,297,452 A * | 3/1994 | Gruss et al. | ......... | 74/467 |
| 5,372,213 A * | 12/1994 | Hasebe et al. | ......... | 180/65.6 |
| 5,443,130 A * | 8/1995 | Tanaka et al. | ......... | 180/65.6 |
| 5,643,127 A * | 7/1997 | Yoshii et al. | ......... | 475/160 |
| 6,206,140 B1 * | 3/2001 | Craft et al. | ......... | 184/8 |
| 6,644,439 B2 * | 11/2003 | Schnitzer | ......... | 184/11.1 |
| 7,240,759 B2 * | 7/2007 | Uemura et al. | ......... | 180/343 |
| 2006/0063633 A1 | 3/2006 | Turner et al. | | |
| 2009/0266198 A1 * | 10/2009 | Nosakowski | ......... | 74/606 R |

FOREIGN PATENT DOCUMENTS

| | | |
|---|---|---|
| EP | 0587389 A1 | 3/1994 |
| EP | 0731291 A2 | 9/1996 |
| JP | S63-135059 U | 9/1988 |

* cited by examiner

*Primary Examiner*—Michael R Mansen
*Assistant Examiner*—Robert T Reese
(74) *Attorney, Agent, or Firm*—Global IP Counselors, LLP

(57) ABSTRACT

A gear unit is basically provided with a gear and a unit case. The gear is arranged and configured to transfer rotation inputted from an external source to at least one driven member. The unit case defines an interior space for enclosing the gear and containing a lubricant to lubricate the gear. The unit case includes an output shaft opening and a lubricant passage. The output shaft opening is configured for connecting the driven member to the gear. The lubricant passage has an inlet provided adjacent the output shaft opening and a lubricant discharge outlet provided in a bottom portion of the unit case to convey lubricant between the output shaft opening and the lubricant discharge outlet.

6 Claims, 6 Drawing Sheets

ND LUBRICATING OIL
GEAR UNIT AND LUBRICATING OIL SPLASH PREVENTING METHOD

CROSS-REFERENCE TO RELATED APPLICATIONS

This application claims priority to Japanese Patent Application No. 2007-027802, filed on Feb. 7, 2007 and Japanese Patent Application No. 2008-11335, filed on Jan. 22, 2008. The entire disclosures of Japanese Patent Application Nos. 2007-027802 and 2008-11335 are hereby incorporated herein by reference.

BACKGROUND OF THE INVENTION

1. Field of the Invention

The present invention generally relates to a gear unit. More specifically, the present invention relates to technology for preventing splashing of lubricating oil that has leaked from the gear unit.

2. Background Information

Vehicles typically has a gear unit, e.g., a final drive unit, that includes a unit case and a pair of output shafts that extend from the unit case toward a left drive wheel and a right drive wheel. An oil seal is provided between the unit case and each of the output shafts to prevent lubricating oil contained inside the unit case from leaking to the outside of the unit case. When the vehicle is turned left or right or accelerated or decelerated, the lubricating oil leans greatly and there is the possibility that lubricating oil will leak from the oil seal, splash about, and adhere to component parts of the vehicle on which it is undesirable for lubricating oil to adhere.

One proposal to prevent lubricating oil that has leaked from splashing is disclosed in Japanese Laid-Open Utility Model Publication No. 63-135059. In this publication, a final drive unit is disclosed that has a lubrication oil splash preventing cover provided around the output shafts to prevent lubricating oil that has leaked from splashing (see FIG. 7 of the publication).

In view of the above, it will be apparent to those skilled in the art from this disclosure that there exists a need for an improved gear unit that prevents splashing of lubricating that has leaked from the gear unit. This invention addresses this need in the art as well as other needs, which will become apparent to those skilled in the art from this disclosure.

SUMMARY OF THE INVENTION

It has been discovered that with the configuration disclosed in Japanese Laid-Open Utility Model Publication No. 63-135059, splashing of leaked lubricating oil can be prevented to some extent. However, with that configuration, lubricating oil captured by the cover nevertheless leaks to the outside of the cover and flows along the surface of the unit case. Thus, the position where leaked lubricating oil drips is still uncontrollable and there is the possibility that it will get on component parts of the vehicle on which it is undesirable for lubricating oil to adhere.

The present invention was conceived in view of this kind of technical problem with the prior technology. One object of the present invention is to prevent lubricating oil from adhering to (getting on) component parts of a vehicle onto which it is undesirable for lubricating oil to adhere.

In order to achieve the above object of the present invention, a gear unit is provided that basically comprises a gear and a unit case. The gear is arranged and configured to transfer rotation inputted from an external source to at least one driven member. The unit case defines an interior space for enclosing the gear and containing a lubricant to lubricate the gear. The unit case includes an output shaft opening and a lubricant passage. The output shaft opening is configured for connecting the driven member to the gear. The lubricant passage has an inlet provided adjacent the output shaft opening and a lubricant discharge outlet provided in a bottom portion of the unit case to convey lubricant between the output shaft opening and the lubricant discharge outlet.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
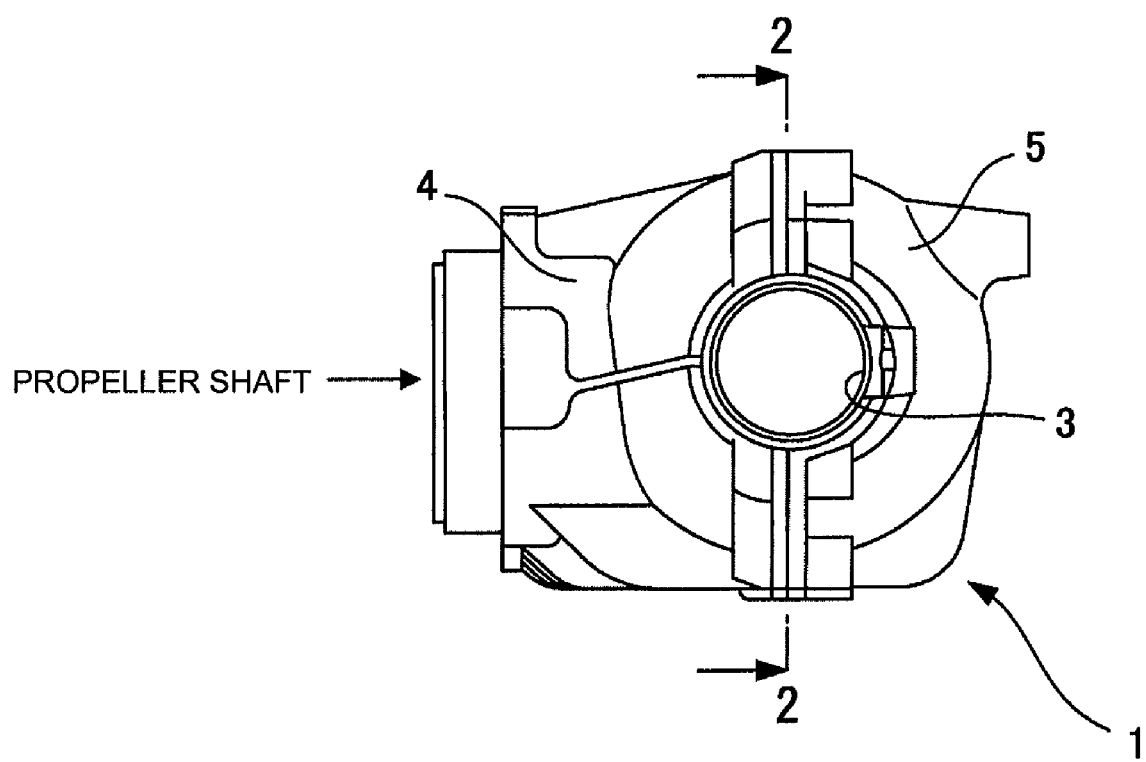
FIG. 1 is a side elevational view of a final drive unit (gear unit) in accordance with one embodiment.
Figure 2:
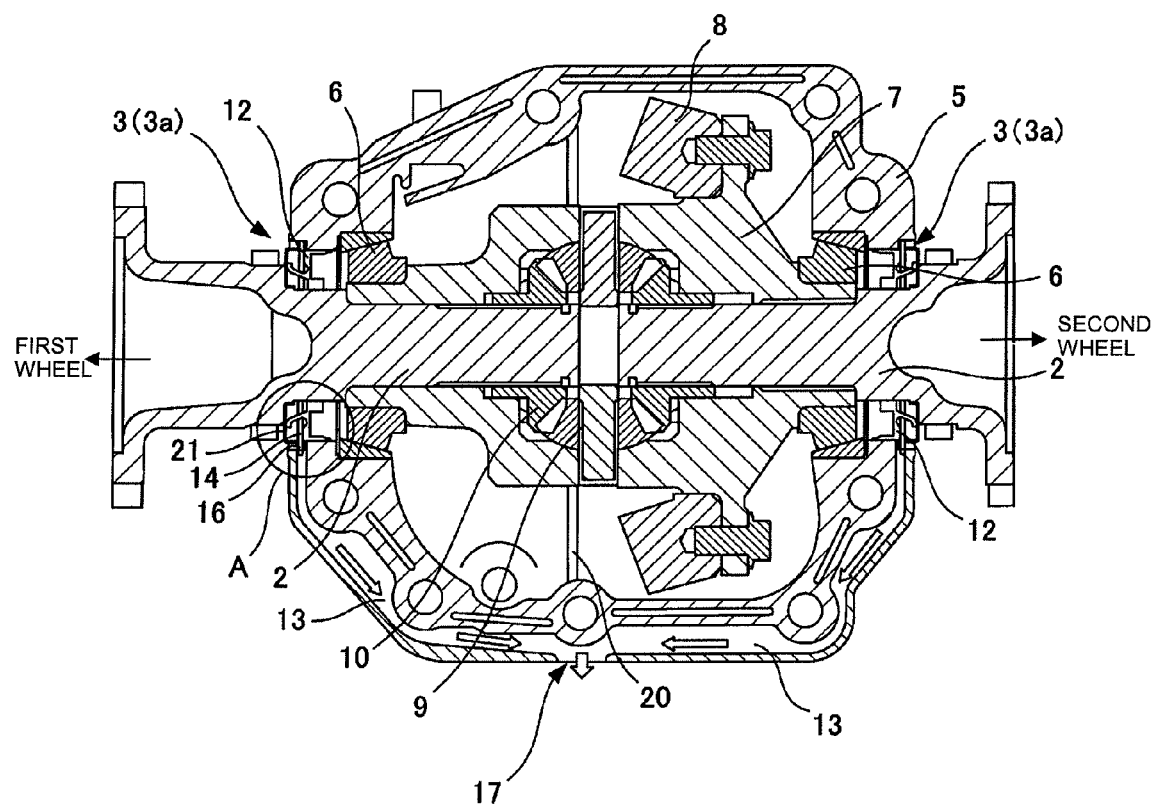
FIG. 2 is a cross sectional view of the final drive unit taken along the section line 2-2 of FIG. 1.
Figure 3:
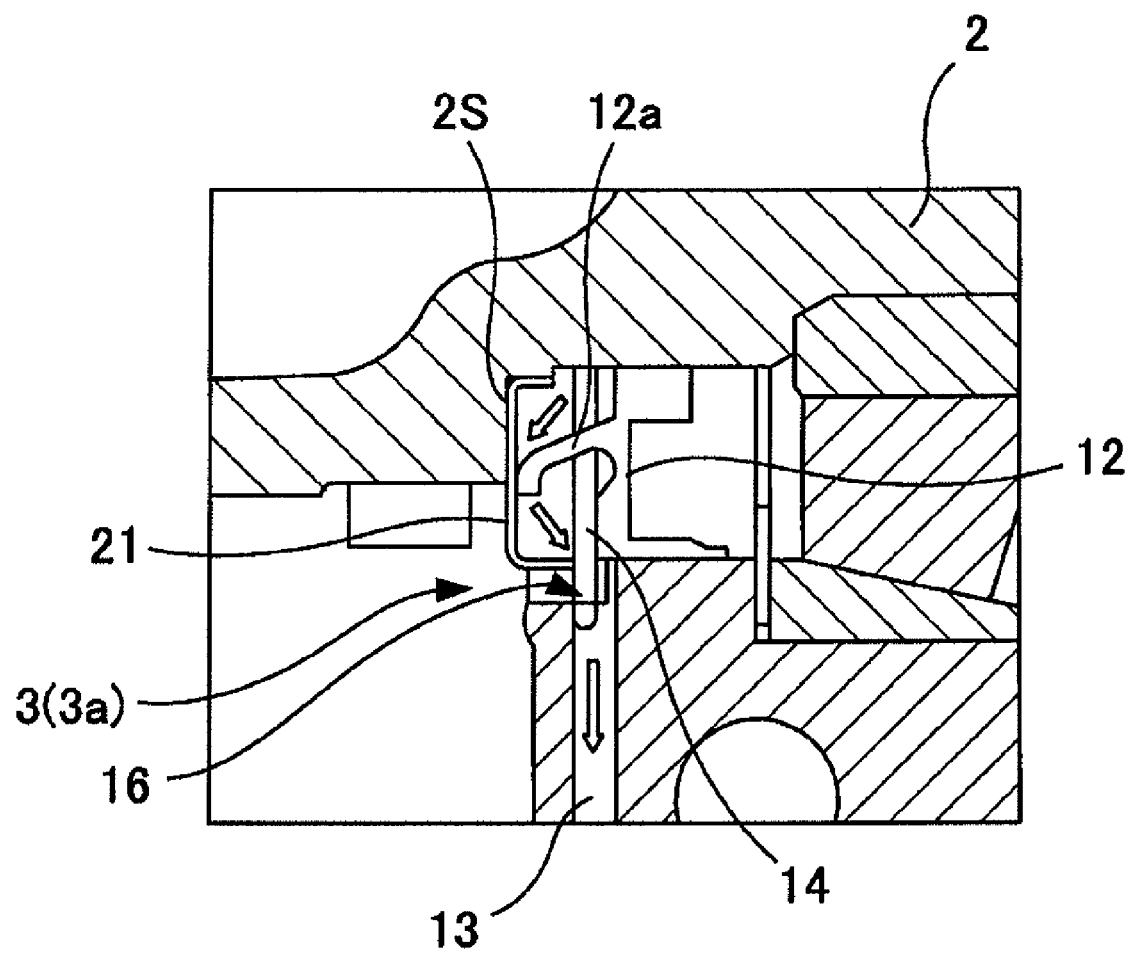
FIG. 3 is an enlarged cross sectional view of the encircled portion A in FIG. 2 of the final drive unit illustrated in FIGS. 1 and 2.

Referring initially to FIGS. 1 to 3, a final drive unit (gear unit) is illustrated in accordance with a first embodiment. The final drive unit has a unit case 1 and a pair of output shafts 2 extending through a pair of output shaft openings 3 formed by the unit case 1. As shown in FIG. 1, the unit case 1 is divided along a transverse direction of the vehicle into frontward and rearward parts or sections such that the division passes through the approximate middle of the output shaft openings 3. The frontward part constitutes a gear carrier 4 and the rearward part constitutes a rear cover 5.

A differential case 7 is supported in a freely rotatable manner inside the unit case 1 by a pair of side bearings 6. Rotation received from an external source (e.g., a propeller shaft) is transferred to the left and right output shafts 2 through a differential mechanism that comprises a ring gear 8, the differential case 7, a pinion gear 9, and a side gear 10. A specified amount of lubricating oil (lubricant) is put inside the unit case 1 to lubricate the differential mechanism. The rotational of the ring gear 8 agitates the lubricating oil and facilitates the lubrication. The differential mechanism is arranged and configured to transfer rotation inputted from an external source (e.g., a propeller shaft of a transmission) to at least one driven member (e.g., the wheels of the vehicle).

Each of the left and right sides of the rear cover 5 includes a semicircular recess 3a forming a portion of one of the output shaft openings 3. An annular oil (lubricant) seal 12 is arranged between each of the semicircular recesses 3a and the respective one of the output shafts 2 to suppress leakage of the lubricating oil from the inside of the unit case 1 to the outside.

A lubricating oil (lubricant) discharge groove 13 is formed in the surfaces of the gear carrier 4 and the rear cover 5 that mates with each other. The lubricating oil discharge groove 13 has a lubricating oil (lubricant) inlet 16 that opens at a bottom position of each of the semicircular recesses 3a. A lubricating oil (lubricant) guide groove 14 is formed around the internal circumference of each of the semicircular recesses 3a. Each of the lubricating oil guide grooves 14 runs in a circumferential direction of the respective one of the recesses 3a. Preferably, a similar lubricating oil discharge groove 13 is preferably formed in the surface of the gear carrier 4 that mates with the rear cover 5 and a similar lubricating oil guide groove 14 is formed in the each of the semicircular recesses 3a forming a portion of an output shaft opening 3 in the gear carrier 4. The lubricating oil discharge grooves 13 and the lubricating oil guide grooves 14 are formed simultaneously when the gear carrier 4 and the rear cover 5 are formed (by, for example, die casting). Alternatively, it will be apparent to those skilled in the art from this disclosure that the lubricating oil discharge grooves 13 and the lubricating oil guide grooves 14 can be formed in only one of the gear carrier 4 and the rear cover 5, if needed and/or desired.

Figure 4:
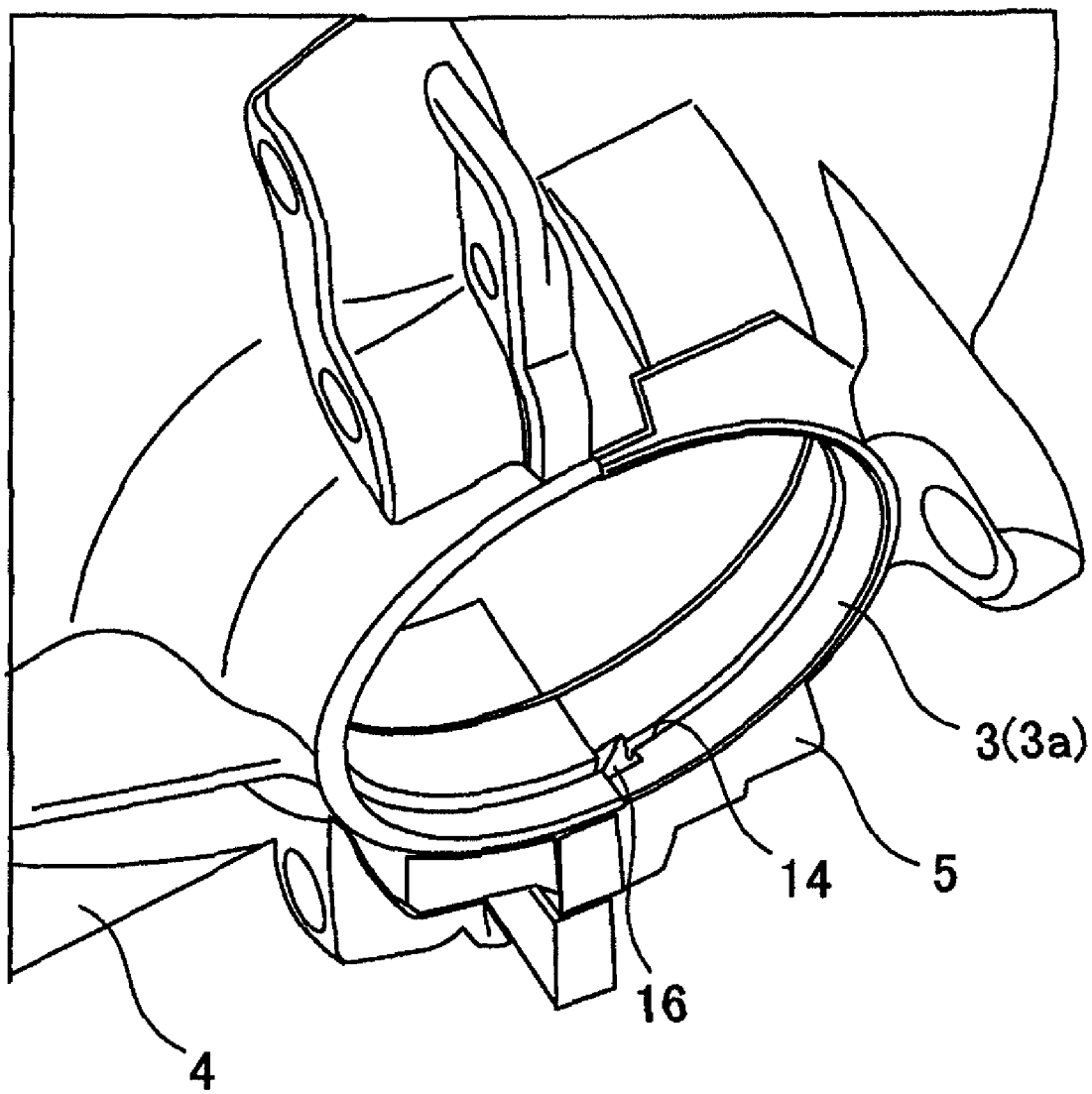
FIG. 4 is a perspective view of one of the output shaft openings of the final drive unit illustrated in FIGS. 1 to 3, with the output shaft removed.
Figure 5:
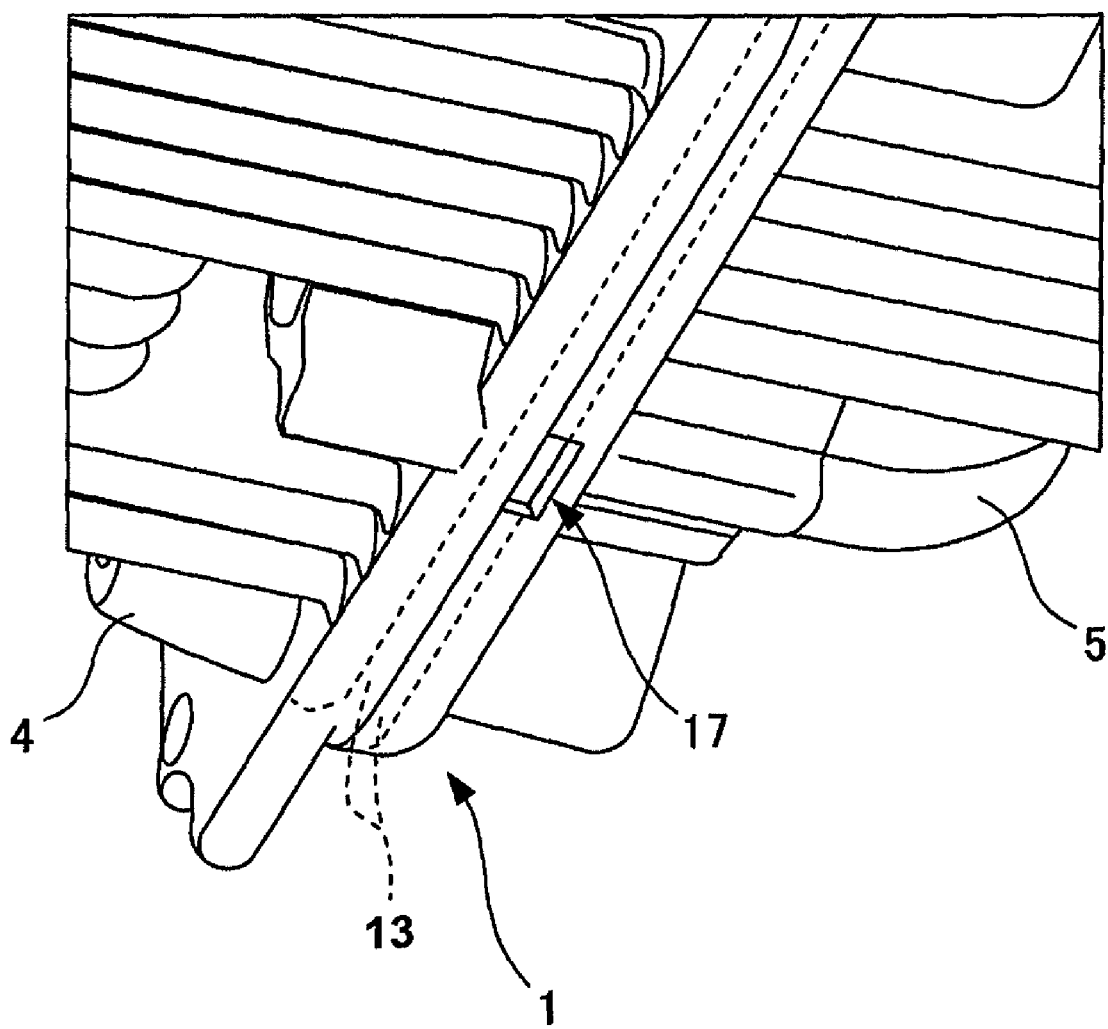
FIG. 5 is a bottom perspective view of the bottom surface of the final drive unit illustrated in FIGS. 1 to 4.

The oil discharge grooves 13 and the lubricating oil guide grooves 14 formed in the gear carrier 4 and the rear cover 5 are configured such that when the gear carrier 4 and the rear cover 5 are mated and bolted together with a gasket in between so as to form the unit case 1, the lubricating oil guide grooves 14 extends around substantially the entire circumference of the output shaft openings 3. Also the lubricating oil (lubricant) inlets 16 are formed below each of the lubricating oil guide grooves 14 as shown in FIG. 4. A lubricating oil (lubricant) discharge opening or outlet 17 is formed in the bottom surface of the unit case 17 as shown in FIG. 5. Furthermore, a lubricating oil discharge passage that follows along an outside wall of the unit case 1 and connects between the lubricating oil inlet 16 and the lubricating oil discharge outlet 17 is formed inside a wall of the unit case 1. Thus, a lubricant passage is formed by the lubricating oil guide grooves 14, which has the inlets 16 provided adjacent the output shaft openings 3 and the lubricant discharge outlet 17 provided in the bottom portion of the unit case 17 to convey lubricant between the output shaft openings 3 and the lubricant discharge outlet 17.

As shown in FIG. 3, an annular dust cover 21 is installed in each of the output shaft openings 3 so as to be positioned farther to the outside than the oil seal 12 of the output shaft 2. The dust covers 21 serve as oil guide members and prevent dust from getting into the unit case 1 from the outside. Each of the dust covers 21 is fitted onto the outside of the respective output shaft 2 and is pushed against a step-like portion 2s formed on the outside circumference of the output shaft 2 by a protruding portion 12a of the respective oil seal 12. The protruding portion 12a protrudes toward the outside of the unit case 1.

Lubricating oil that leaks from the oil seal 12 is collected by the dust cover 21 and directed to the internal circumference of the output shaft opening 3. The redirected lubricating oil is guided to the lubricating oil inlet 16 by the lubricating oil guide groove 14. The redirected lubricating oil then flows to the lubricating oil discharge outlet 17 via the lubricating oil discharge passage formed inside the wall of the unit case 1 by the lubricating oil discharge grooves 13. The lubricating oil is discharged from the lubricating oil discharge outlet 17 to the outside of the vehicle.

Figure 6:
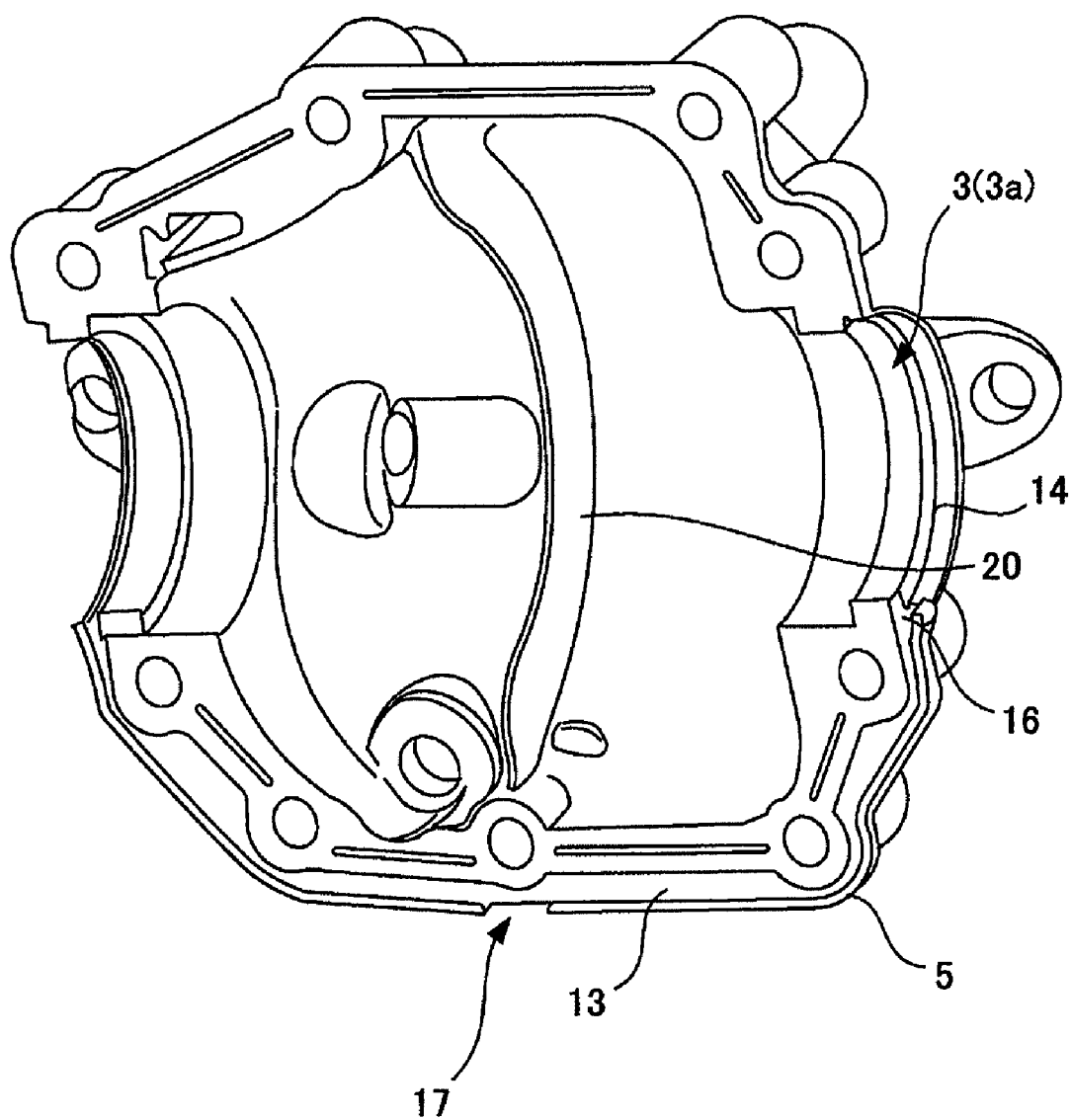
FIG. 6 is a perspective view of a rear cover of the final drive unit illustrated in FIGS. 1 to 5.

Additionally, as shown in FIG. 6, a fin-shaped flow directing plate 20 is provided in a substantially middle portion of an inside wall of the rear cover 5 in such a position as not to interfere with the rotation of the ring gear 8. The flow directing plate 20 protrudes from the output shaft 2 and extends in a rotational direction of the output shaft 2. The flow directing plate 20 serves to reduce the amount of lubricating oil movement between the left and right sides of the inside of the unit case 1 and to cause the lubricating oil agitated by the ring gear 8 to flow along the internal wall of the unit case 1 so as to rotate about the inside of the unit case 1. The flow directing plate 20 is formed as an integral part of the rear cover 5 when the rear cover 5 is formed.

The operational effects obtained with a final drive unit configured as described above in accordance with the present invention will now be explained.

In a final drive unit in accordance with the present invention, as described previously, the unit case 1 is divided along a generally transverse direction of the vehicle into frontward and rearward sections such that the division passes through the output shaft openings 3. The frontward part constitutes the gear carrier 4 and the rearward part constitutes the rear cover 5. The lubricating oil discharge groove 13 extends from the output shaft openings 3 to a bottom surface of the unit case 1 in at least one of the mating surfaces of the gear carrier 4 and the rear cover 5.

Lubricating oil that leaks from the unit case 1 passes through the lubricating oil discharge groove 13 to the bottom of the unit case 1 and is discharged to the outside of the vehicle from the bottom surface (lubricating oil discharge outlet 17) of the unit case 1. Since normally there are not any component parts of the vehicle existing below the bottom surface of the unit case 1, the occurrence of lubricating oil adhering to component parts of the vehicle can be suppressed.

Since the lubricating oil discharge grooves 13 are formed in the mating surfaces of the gear carrier 4 and the rear cover 5, the lubricating oil discharge grooves 13 can be formed when the gear carrier 4 and the rear cover 5 are formed and the additional cost of forming the lubricating oil discharge grooves 13 can be held to a minimum.

Although in the embodiment described above lubricating oil discharge grooves 13 are provided in both the gear carrier 4 and the rear cover 5, a lubricating oil discharge passage can be formed inside the wall of the bottom side of unit case 1 so long as a lubricating oil discharge groove in is formed in at least one of the gear carrier 4 and the rear cover 5.

The embodiment described above is provided with a guide member that serves to collect lubricating oil that has leaked from the oil seal 12 and guide the collected lubricating oil to an opening of the lubricating oil guide grove 13 that is arranged at the output shaft opening 3. As a result, lubricating oil that leaks from the unit case 1 can be guided more reliably to the lubricating oil discharge groove 13 and splashing of the lubricating oil can be suppressed to a greater degree.

In the embodiment described above, the dust cover 21 is a guide member that is provided in order to prevent dust from entering the unit case 1 from the outside. With this arrangement, the cost can be reduced because it is not necessary to provide a guide member separately from the dust cover 21. Although the embodiment described above uses the dust cover 21 as the guide member, it is also possible for the guide member to be a rib that is formed on an external circumference of the output shaft 2, a ring-shaped member that is attached to the output shaft 2, a rib that is formed on an internal circumference of the output shaft opening 3, or a ring-shaped member that is installed into the output shaft opening 3.

In the embodiment described above, the lubricating oil guide grooves 14 are provided in the internal circumferences of the output shaft openings 3 to connect to the respective openings of the lubricating oil discharge grooves 13 provided at the output shaft opening 3. The lubricating oil guide grooves 14 are configured to span around substantially an entire inner circumference of the output shaft openings 3. As a result, lubricating oil that leaks at a side portion or upper portion of one of the output shaft openings 3 can be guided to the respective opening (lubricating oil inlet 16) of the lubricating oil discharge grooves 13 that is provided at the output shaft opening 3 and splashing of the lubricating oil can be suppressed even to an even greater degree.

Although in the embodiment described above the lubricating oil guide grooves 14 are formed by making a recessed groove in the inner circumference of the output shaft openings 3, other methods of forming the lubricating oil discharge groove 13 can be used. For example, the lubricating oil discharge groove 13 can be formed by forming strip-shaped protrusions that following along the internal circumference of the output shaft opening 3.

In the embodiment described above, the fin-shaped flow directing plate 20 is provided in a substantially middle portion of an inside wall of the rear cover 5 and protrudes towards the output shafts 2 and extend in a rotational direction of the output shaft 2. The flow directing plate 20 serves to reduce the amount of lubricating oil movement between the left and right sides of the inside of the unit case 1 and to cause the lubricating oil agitated by the ring gear 8 to flow along the internal wall of the unit case 1 so as to rotate about the inside of the unit case 1. Consequently, even if the lubricating oil leans to one side or the other inside the unit case 1 when the vehicle is turned left or right, the lubricating oil continues to rotate along the internal wall of the unit case 1 and the amount of oil that leaks from the output shaft opening 3 to the outside of the unit case 1 is reduced. As a result, the amount of lubricating oil that splashes from the unit case 1 can be reduced.

In particular, since the amount of lubricating oil leakage from output shaft opening 3 on the side of the unit case 1 where the ring gear 8 is housed (right side in FIG. 2) can be reduced, the lubricating oil discharge groove 13 on the side where the ring gear 8 is housed can be made narrower than on the other side. As a result, the unit case 1 can be prevented from becoming large as a result of providing the lubricating oil discharge groove 13. This is advantageous because layout space is greatly restricted on the side of the unit case 1 where the ring gear 8 located in the embodiment described above, the flow directing plate 20 is formed as an integral part of the rear cover 5. However, it is acceptable for the flow directing plate 20 to be provided as a separate member and attached to the rear cover 5 at the time of assembly.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the gear unit. Accordingly, these terms, as utilized to describe the present invention should be interpreted relative to a vehicle equipped with the gear unit. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Also for example, although the illustrated embodiment presents a final drive gear as a gear unit, the gear unit can also be a transfer gear unit that is arranged such that the output shaft extends in the transverse direction of a vehicle. In such a gear unit, the unit case can be divided in a generally transverse direction of the vehicle such that the division passes through the output shaft openings and a lubricating oil discharge groove can be provided in at least one of the mating surfaces of the two sections comprising the unit case. Additionally, the oil passage that guides lubricating oil from the output shaft opening to the lubricating oil discharge outlet does not have to be formed by a groove or grooves formed in the mating surfaces of the unit case; it can also be formed by a through hole formed between an inside surface of the unit case and an outside surface of the unit case. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A gear unit comprising:

at least one gear arranged and configured to transfer rotation inputted from an external source to at least one driven member; and a unit case defining an interior space for enclosing the at least one gear and containing a lubricant to lubricate the at least one gear, the unit case including an output shaft opening configured for connecting the driven member to the at least one gear, and a lubricant passage having an inlet provided adjacent the output shaft opening and a lubricant discharge outlet provided in a bottom portion of the unit case to convey lubricant between the output shaft opening and the lubricant discharge outlet, the output shaft opening of the unit case constituting a first output shaft opening and the unit case including a second output shaft opening, the lubricant passage of the unit case further extending between an additional inlet provided adjacent the second output shaft opening and the lubricant discharge outlet, the at least one gear being a differential mechanism with first and second output shafts extending through the first and second output shaft openings of the unit case, the unit case including a frontward part constituting a gear carrier and a rearward part constituting a rear cover, with each of the first and second output shaft openings being partially defined by the frontward part and partially defined by rearward part, and the lubricant passage being at least partially formed in at least one of a mating surface of the gear carrier and a mating surface of the rear cover, with the gear carrier and the rear cover mating at the mating surfaces.

2. A gear unit comprising:

at least one gear that is a differential mechanism having first and second output shafts, the gear being arranged and configured to transfer rotation inputted from an external source to at least one driven member;

a unit case defining an interior space for enclosing the at least one gear and containing a lubricant to lubricate the at least one gear, the unit case including a first output shaft opening configured for connecting the driven member to the at least one gear, the first output shaft of the differential mechanism extending through the first output shaft opening of the unit case, a second output shaft opening configured for connecting the driven member to the at least one gear, the second output shaft of the differential mechanism extending through the second output shaft opening of the unit case, and a lubricant passage having a first passage part with an inlet provided adjacent the first output shaft opening, a second passage part with an inlet provided adjacent the second output shaft opening, and a lubricant discharge outlet provided in a bottom portion of the unit case to convey lubricant leaking from the first and second output shaft openings to the lubricant discharge outlet, the first and second passage parts of the lubricant passage extending from the inlets to the lubricant discharge outlet such that the lubricant leaking from the first and second output shaft openings is discharged from the lubricant discharge outlet to outside the unit case via the lubricant discharge outlet, while the lubricant inside the unit case lubricates the at least one gear; and a guide member provided in each of the first and second output shaft openings and arranged to collect lubricant that has leaked from the unit case and to guide the lubricant that is collected to the lubricant passage.

3. The gear unit as recited in claim 2, wherein the unit case includes a frontward part constituting a gear carrier and a rearward part constituting a rear cover, with each of the first and second output shaft openings being partially defined by the frontward part and partially defined by rearward part.

4. The gear unit as recited in claim 2, wherein the guide member is a dust cover for preventing dust from entering the unit case through the first and second output shaft openings.

5. A gear unit comprising:

at least one gear that is a differential mechanism having first and second output shafts, the gear being arranged and configured to transfer rotation inputted from an external source to at least one driven member; and a unit case defining an interior space for enclosing the at least one gear and containing a lubricant to lubricate the at least one gear, the unit case including a first output shaft opening configured for connecting the driven member to the at least one gear, the first output shaft of the differential mechanism extending through the first output shaft opening of the unit case, a second output shaft opening configured for connecting the driven member to the at least one gear, the second output shaft of the differential mechanism extending through the second output shaft opening of the unit case, and a lubricant passage having a first passage part with an inlet provided adjacent the first output shaft opening, a second passage part with an inlet provided adjacent the second output shaft opening, and a lubricant discharge outlet provided in a bottom portion of the unit case to convey lubricant leaking from the first and second output shaft openings to the lubricant discharge outlet, the first and second passage parts of the lubricant passage extending from the inlets to the lubricant discharge outlet such that the lubricant leaking from the first and second output shaft openings is discharged from the lubricant discharge outlet to outside the unit case via the lubricant discharge outlet, while the lubricant inside the unit case lubricates the at least one gear; and the unit case including first and second lubricant guide grooves extending circumferentially around the first and second output shaft openings, respectively, with the lubricant passage being connected to the first and second lubricant guide grooves.

6. The gear unit as recited in claim 5, wherein the unit case includes a frontward part constituting a gear carrier and a rearward part constituting a rear cover, with each of the first and second output shaft openings being partially defined by the frontward part and partially defined by rearward part.

* * * * *